(12) United States Patent
Reynolds (10) Patent No.: US 7,500,766 B1
(45) Date of Patent: Mar. 10, 2009

(54) TINTED LENS ASSEMBLY FOR RECESSED COMPACT FLUORESCENT LIGHTS

(76) Inventor: Elaine M Reynolds, 26076 Harbor View, Dana Point, CA (US) 92624

( * ) Notice: Subject to any disclaimer, the term of this patent is extended or adjusted under 35 U.S.C. 154(b) by 0 days.

(21) Appl. No.: 11/964,706

(22) Filed: Dec. 26, 2007

(51) Int. Cl.
*F21V 17/00* (2006.01)

(52) U.S. Cl. .................. 362/364; 362/365; 362/374; 362/433

(58) Field of Classification Search ......... 362/293, 362/364, 365, 374, 404, 296, 277, 433
See application file for complete search history.

(56) References Cited

U.S. PATENT DOCUMENTS

| | | | |
|---|---|---|---|
| 2,510,873 A | | 6/1950 | Early |
| 4,745,533 A | * | 5/1988 | Smerz ................ 362/364 |
| 5,373,423 A | * | 12/1994 | Liedtke et al. ............ 362/510 |
| 5,533,306 A | * | 7/1996 | Aspenson .................... 52/144 |
| 5,746,498 A | * | 5/1998 | Rogge ................ 362/488 |
| 5,934,786 A | * | 8/1999 | O'Keefe .................... 362/147 |
| 6,168,299 B1 | | 1/2001 | Yan |
| 6,454,439 B1 | | 9/2002 | Camarota |
| 7,014,341 B2 | | 3/2006 | King |
| 7,018,077 B2 | | 3/2006 | Mullen |
| 7,153,011 B2 | * | 12/2006 | Shen et al. ................ 362/510 |
| 2003/0193808 A1 | | 10/2003 | Mullen |
| 2007/0183154 A1 | | 8/2007 | Robson |
| 2007/0253193 A1 | | 11/2007 | Lau |

* cited by examiner

*Primary Examiner*—Thomas M Sember
(74) *Attorney, Agent, or Firm*—Donald W. Meeker (57) ABSTRACT

A tinted glass lens is attached to an existing light baffle and a new frame to form a removable assembly. The assembly is installed in an existing ceiling recessed lighting fixture having a compact fluorescent bulb to cut glare and cover the bulb. The assembly removably attaches with tensioning spring hooks contacting an existing can. The tinted lens has a bottom reflective coating to match ceiling and can be interchanged with lenses of other tints to create desired lighting effects.

12 Claims, 7 Drawing Sheets

FIG. 7

TINTED LENS ASSEMBLY FOR RECESSED COMPACT FLUORESCENT LIGHTS

CROSS-REFERENCE TO RELATED APPLICATIONS

Not Applicable.

STATEMENT REGARDING FEDERALLY SPONSORED RESEARCH OR DEVELOPMENT

Not Applicable.

THE NAMES OF THE PARTIES TO A JOINT RESEARCH OR DEVELOPMENT

Not Applicable.

BACKGROUND OF THE INVENTION

1. Field of the Invention

The present invention relates to lens holders or supports for light fixtures and particularly to a tinted lens and frame assembly which may be installed in an existing recessed light unit for use with a compact fluorescent bulb; the tinted lens and frame assembly comprising a glass lens which is tinted and coated with a camouflaging white reflective coating on an outer visible surface, and a frame whose color matches that of a white ceiling so that when the light is turned off all that is visible is the white frame, white baffle and white glass surface; the existing light baffle is attached to the new frame and the new tinted lens is attached to the existing baffle, tensioning spring hooks are attached to the baffle or the frame so that the new lens unit instantly snaps into place in the existing can and removes instantly for bulb replacement.

2. Description of Related Art including information disclosed under 37 CFR 1.97 and 1.98

Commonly used incandescent light bulbs utilize a substantial amount of electricity and create excessive heat. Standard incandescent bulbs are being replaced by more efficient compact fluorescent bulbs which produce more light, and use less electricity while generating less heat.

In recessed lighting fixtures in ceilings, an existing truncated conical light baffle fits into the existing recessed light can in the ceiling with a large opening in the baffle through which the incandescent light bulb is normally visible to admit light through the opening. Due to the unusual appearance of the compact fluorescent light fixtures and the bright white light produced, it would be desirable to filter the light to produce a more pleasant light quality which may be colored in any desired tone. Prior art devices do not adequately address these problems in recessed ceiling light fixtures.

U.S. Pat. No. 6,168,299, issued Jan. 2, 2001 to Yan, describes a novel energy efficient recessed downlighted lighting fixture, using a compact laterally twisted, fluorescent lamp, and electronic ballast, provides an easy to install procedure for retrofit installations. Using an integrated socket-and-ballast subassembly, the overall height is reduced so that it can find use with existing metal housings. This recessed fixture uses a newly designed energy efficient compact fluorescent lamp as the primary lighting source. This fluorescent lamp, which is a laterally twisted tube commonly referred to as a "springlamp" allows the shortest lamp known to the fluorescent lamp industry. It provides for minimal light trapping, thereby creating the maximum concentrated lighting output, and lighting distribution that is closest to the illumination supplied by an incandescent bulb. The laterally twisted "SpringLamp" is centrally positioned at the focal point of the parabolically shaped portion of the reflector to produce a collimated-like downlighted column of concentrated light that enhances the illumination efficiency when measured at the central portion of the beam. The device has a flanged skirt which provides a decorative painted surface that is compatible in color with most off-white ceiling treatments.

U.S. Patent Application #20070253193, published Nov. 1, 2007 by Lau, relates a ceiling lighting retrofit system. The retrofit system comprises a reflector and a trim ring. The reflector is comprised of a continuous piece of rigid material in a roughly cylindrical shape possessing an interior and exterior surface, the reflector possessing a lampholder end and a reflector end, the interior surface of the reflector end coated with a reflective material, the lampholder end possessing an aperture connector, the interior surface of the lampholder end of the reflector sized to fit snugly over the standard sockets used in incandescent and fluorescent light fixtures. The reflector end of the reflector shaped in such a way as to concentrate a beam of light generated at the lampholder end into a concentrated beam exiting the reflector end of the reflector. The trim rim is a hollow piece of rigid material attached fixedly to the reflector end of the reflector, the trim rim extending outside the outer diameter of the reflector end of the reflector. This system can also use a compact fluorescent light bulb that produces substantially less heat than an incandescent bulb.

U.S. Patent Application #20070183154, published Aug. 9, 2007 by Robson, illustrates a sealed cover for a recessed light fixture, the cover having a housing composed of heat-tolerant material, and having visible trim ring, and a means for retaining said cover to said fixture. Light generated by the recessed light fixture will pass through the lens, which may be transparent, translucent, or colored. The invention is sized to fit within the baffle of a preexisting recessed light fixture, to which the invention may be frictionally engaged, and over the outer trim of such a fixture, to which the invention will form an airtight seal through the use of a seal ring. The invention seeks to promote energy efficiency by providing an airtight barrier which inhibits the passage of conditioned (furnace-heated or air conditioner-cooled) air through the recessed light fixture and out of the living space. Energy efficiency is also promoted by encouraging (though not necessitating) conversion from incandescent bulbs to compact fluorescent bulbs. Further, the airtight barrier has the desirable effect of prohibiting the movement of insects through the recessed light fixture and into the living space. The invention can be easily installed without tools or special skill, and can be easily removed to allow for bulb replacement. It can be manufactured in varying shapes and sizes, including sizes conforming to standard recessed light fixtures having circular openings with 4-inch and 6-inch diameters, and with tapered and non-tapered baffles.

U.S. Patent Application #20030193808, published Oct. 16, 2003 by Mullen, is for an attachment for a recessed light fixture for retaining lenses. The lenses may be, for example, colorless transparent lenses, colored transparent lenses, colorless translucent lenses, colored translucent lenses, louvered grates, and diffusing grids. Further, the lenses may be made out of any material that is known in the art or has yet to be developed, but are preferably made of a rigid material such as plastic. The preferred embodiment of the invention comprises generally an attachment body and an attachment insert. The attachment body comprises an inner sleeve, a means for retaining the inner sleeve on a recessed housing, an upper eave connected to the inner sleeve, a recessed cavity in the upper eave, and a means for securing the attachment insert to the attachment body. The attachment insert is designed to rest in the recessed cavity of the upper eave. The attachment body is adapted to have dimensions such that the inner sleeve fits inside the housing of a recessed light fixture. In addition, the inner sleeve and upper eave define voids and it is generally desirable for the inner sleeve, upper eave and voids to have dimensions such that light is permitted to pass there through. The attachment insert is removably connected to the attachment body and supports a lens. In the preferred embodiment, the attachment insert is constructed such that it retains one or more lenses substantially in the recessed cavity contained in the upper eave. The means for connecting the attachment insert to the attachment body in the preferred embodiment is a screw thread on an outer surface of the attachment insert that is compatible with a screw thread on an inner surface of the attachment body.

U.S. Pat. No. 7,018,077, issued Mar. 28, 2006 to Mullen, is for an attachment for a recessed light fixture for retaining lenses. The lenses may be, for example, colorless transparent lenses, colored transparent lenses, colorless translucent lenses, colored translucent lenses, louvered grates, and diffusing grids. Further, the lenses may be made out of any material that is known in the art or has yet to be developed, but are preferably made of a rigid material such as plastic. The preferred embodiment of the invention comprises generally an attachment body and an attachment insert. The attachment body comprises an inner sleeve, a means for retaining the inner sleeve on a recessed housing, an upper eave connected to the inner sleeve, a recessed cavity in the upper eave, and a means for securing the attachment insert to the attachment body. The attachment insert is designed to rest in the recessed cavity of the upper eave. The attachment body is adapted to have dimensions such that the inner sleeve fits inside the housing of a recessed light fixture. In addition, the inner sleeve and upper eave define voids and it is generally desirable for the inner sleeve, upper eave and voids to have dimensions such that light is permitted to pass there through. The attachment insert is removably connected to the attachment body and supports a lens. In the preferred embodiment, the attachment insert is constructed such that it retains one or more lenses substantially in the recessed cavity contained in the upper eave. The means for connecting the attachment insert to the attachment body in the preferred embodiment is a screw thread on an outer surface of the attachment insert that is compatible with a screw thread on an inner surface of the attachment body.

U.S. Pat. No. 2,510,873, issued Jun. 6, 1950 to Early, provides a light filter device which can be easily connected to or removed from a light projecting device, such as a cockpit light. The device comprises an annular holder which fits inside the tubular body of a light projection device. A colored filtering lens is held within a groove in the annular holder.

U.S. Pat. No. 7,014,341, issued Mar. 21, 2006 to King, claims a decorative luminaire capable of providing illumination having differing uses. The luminaire comprises: at least one source of light carried by the luminaire; a first reflector disposed within the luminaire and carried thereby, at least a portion of the light generated by the at least one source of light exiting an aperture of the first reflector; a second reflector carried by the luminaire and disposed about the first reflector, inner surfaces of the second reflector being spaced from outer surfaces of the first reflector about said first reflector thus forming an annulus therebetween at an aperture of the second reflector, at least a portion of the light generated by the at least one source of light exiting the luminaire through the annulus; and, light altering means carried by the luminaire and disposed between the first and second reflectors and spaced from the annulus for changing the character of that light exiting the luminaire through the annulus to thereby provide a decorative effect.

U.S. Pat. No. 6,454,439, issued Sep. 24, 2002 to Camarota, discloses a method for manufacturing a light assembly from interchangeable components with different characteristics. The light assembly includes a frame and a body disposed within the frame. A reflector, a socket and a bulb are disposed in the body. A lens is fitted over the reflector, socket and bulb. The lens is snap fitted in a bezel ring. The bezel ring is snap fitted over to the body so as to be positioned around the reflector. The body is snap-fitted to the frame. An assembler of the light assembly of this invention can maintain a stock of frames, bodies and bezel rings that have different colors or other characteristics, such as on/off switches. Upon receiving an order for a light assembly in which the specific characteristics of the color are specified, the assembler selects the appropriate components from stock and assembles them together to provide the desired assembly. Also, different versions of the lens may be dyed different so that each version only transmits a selected wavelength, (color,) of light.

What is needed is a recessed lighting frame assembly which hides a compact fluorescent light in a recessed lighting can in a ceiling and which filters the light to produce a more pleasant light quality which may be colored in any desired tone.

BRIEF SUMMARY OF THE INVENTION

An object of the present invention is to provide a recessed lighting frame assembly attaching a tinted glass for producing the desired quality of light which tinted glass is further coated with a camouflaging white reflective coating on an outer visible surface over the opening in an existing light baffle to hide the compact fluorescent light in a recessed lighting can in a ceiling.

Another object of the present invention is to provide a removable tinted lens that can be switched with lenses of different tints.

In brief, a tinted lens and frame assembly which may be installed in an existing recessed light unit with a compact fluorescent bulb; the tinted lens and frame assembly comprising a glass lens which is tinted and coated with a camouflaging white reflective coating on an outer visible surface, and a frame whose color matches that of a white ceiling so that when the light is turned off all that is visible is the white frame, white baffle and white glass surface; the existing light baffle is attached to the new frame and the new tinted lens is attached to the existing baffle, tensioning spring hooks are attached to the baffle or the frame so that the new lens unit instantly snaps into place in the existing can and removes instantly for bulb replacement.

An advantage of the present invention is economic use of compact fluorescent bulbs in recessed lighting fixtures without having to see the unsightliness of the bulb.

Another advantage of the present invention is that the lens reduces the normal white glare caused by fluorescent bulbs.

One more advantage of the present invention is that the lens is interchangeable with lenses of different tints, allowing for different effects for work lighting, holiday lighting, mood lighting, etc.

Another advantage of the present invention is that the reflective coating on the lens and the frame are color coated to match the ceiling, usually white.

An additional advantage of the present invention is the assembly is easily and instantly removable and replaceable in order to change the light bulb.

A further advantage of the present invention is that it is a simple assembly that uses the preexisting recessed light baffle, keeping the cost of the assembly down.

An additional advantage of the present invention is a more economically and ecologically attractive lighting alternative to standard incandescent recessed lighting.

BRIEF DESCRIPTION OF THE SEVERAL VIEWS OF THE DRAWINGS

These and other details of my invention will be described in connection with the accompanying drawings, which are furnished only by way of illustration and not in limitation of the invention, and in which drawings.

DETAILED DESCRIPTION OF THE INVENTION

In FIGS. 1-7, a tinted lens and frame assembly 10 is installed in an existing recessed light unit 30 having a compact fluorescent bulb 32.

Figure 1:
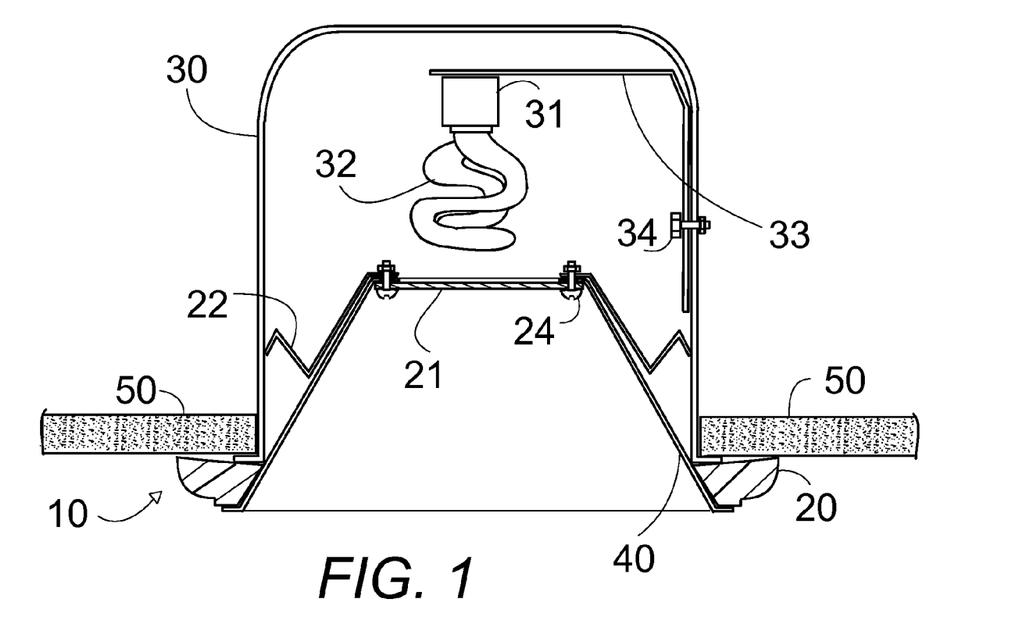
FIG. 1 is a partial cross-sectional view of the tinted glass lens assembly of the present invention shown installed in a ceiling recessed light fixture using a compact fluorescent bulb.
Figure 2:
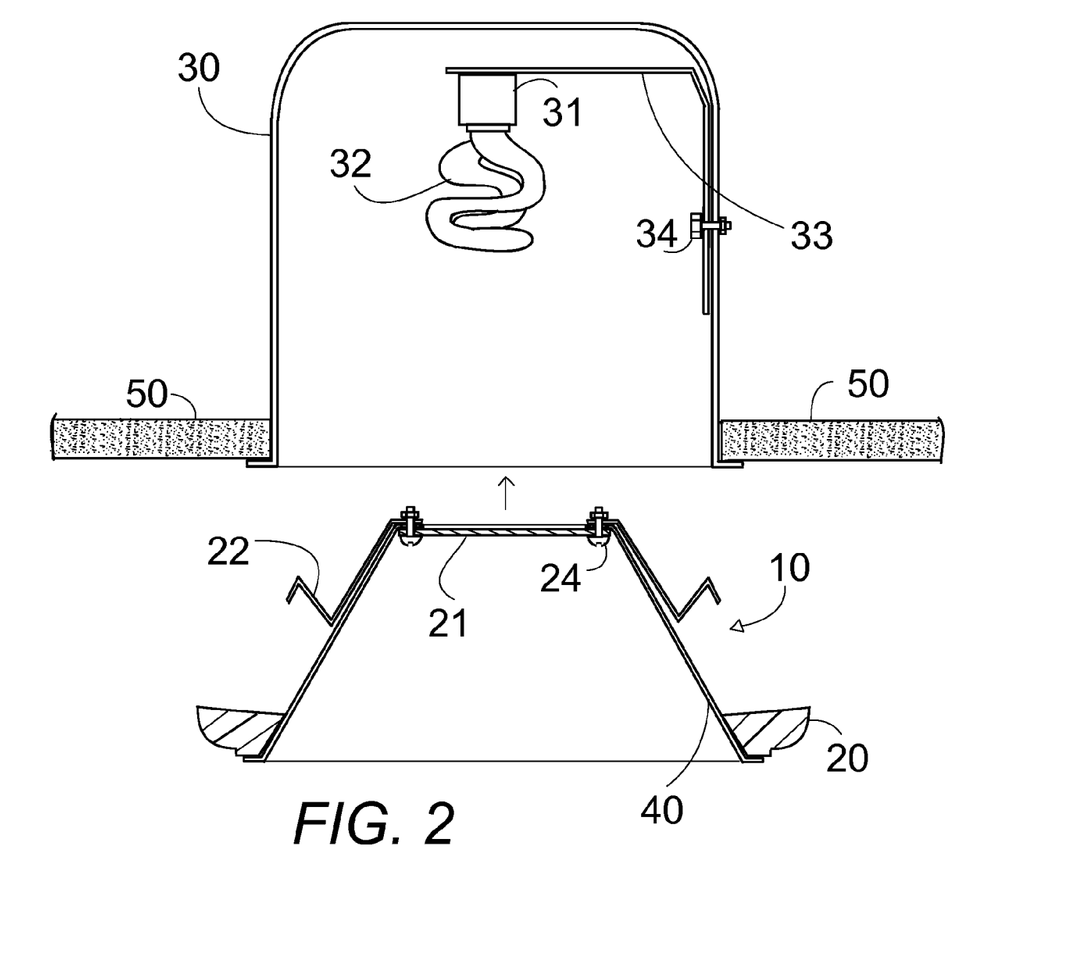
FIG. 2 is a broken partial cross-sectional view of the tinted glass lens assembly of FIG. 1 with the lens assembly aligned for installation in the ceiling recessed light fixture using a compact fluorescent bulb.
Figure 3:
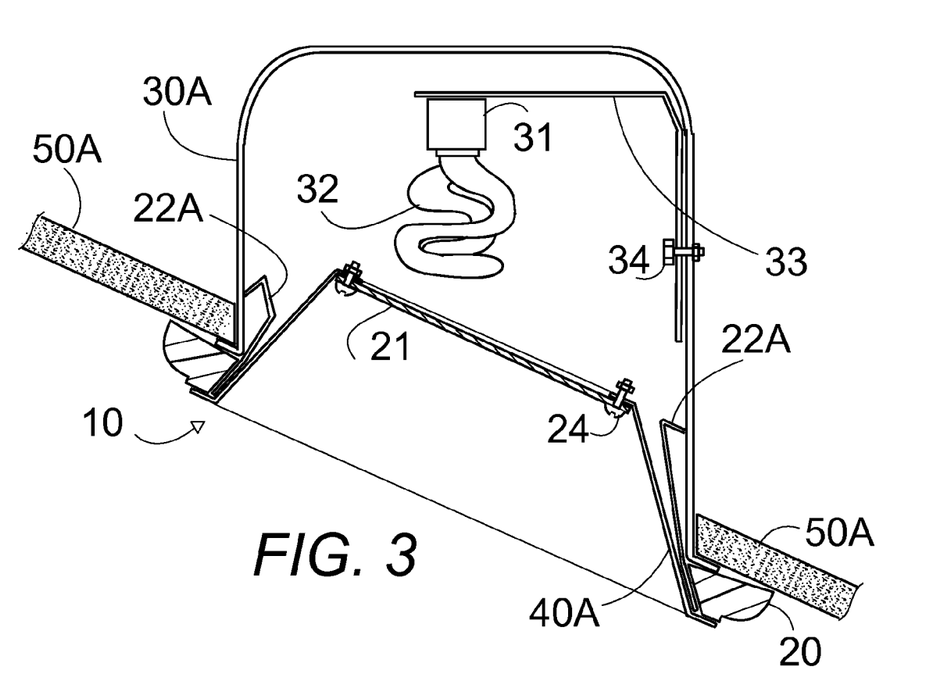
FIG. 3 is a partial cross-sectional view of an alternate embodiment of the tinted glass lens assembly of the present invention for sloping ceiling recessed lighting with the lens assembly shown installed in a sloping ceiling recessed light fixture using a compact fluorescent bulb.
Figure 4:
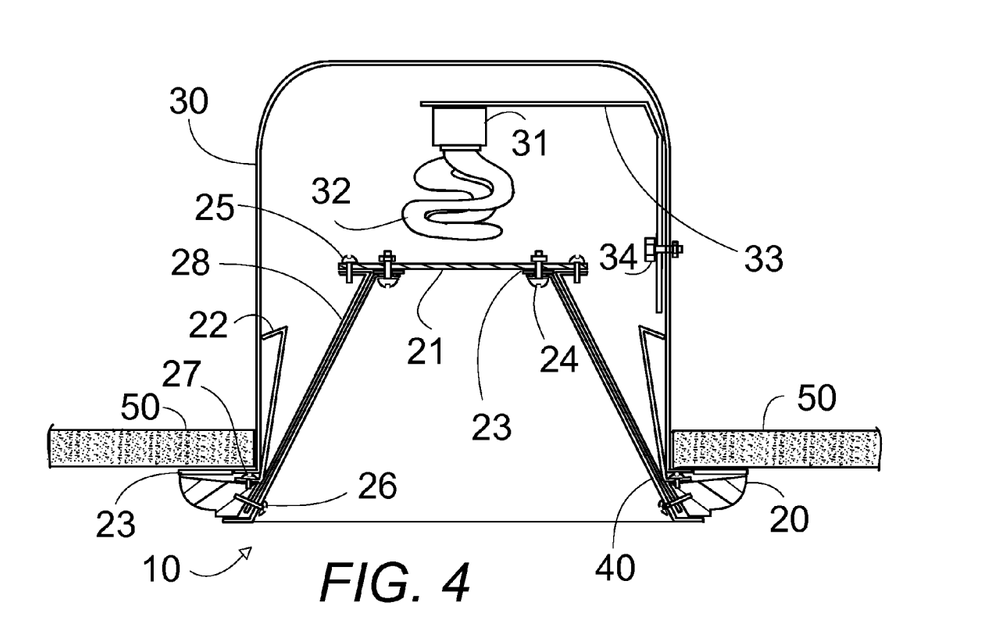
FIG. 4 is a partial cross-sectional view of an alternate embodiment of the tinted glass lens assembly of the present invention having a lens bracket to mount the lens above the light baffle with the lens assembly shown installed in a bathroom ceiling recessed light fixture using a compact fluorescent bulb.

In FIGS. 1-4, the lens assembly 10 comprises a frame 20 structured to fit against a ceiling surface 50 surrounding a recessed lighting opening 30 in a ceiling. The recessed lighting opening 30 houses an existing recessed lighting can 30 with a light fixture socket 31 recessed within the can 30 to hold a compact fluorescent light bulb 32. In FIGS. 1-3, the frame 20 is seated on the preexisting light baffle 40 which extends into the recessed lighting opening. In FIG. 4, the light baffle 40 is attached with screws 26 to the frame 20. The light baffle 40 has a bottom opening that mates with the frame 20 and a top opening for admitting light therethrough. A tinted light transmitting lens 21 is attached at the top of the light baffle 40 to cover the top opening, the lens 21 being tinted to produce a desired light quality and the bottom surface of the lens coated with a camouflaging reflective coating to hide the compact fluorescent bulb from view when the bulb is not producing light. A series of tensioning spring hooks 22 extend outwardly peripherally around the lens assembly and contact the can 30 to removably retain the lens assembly 10 in the can, with the frame 20 contacting the ceiling 50.

FIG. 3 shows the tinted glass lens assembly 10 in an angled ceiling application comprising a custom shaped sloped recessed light baffle 40A held in the existing recessed angled lighting can 30A by new spring hooks 22A that are attached to the frame 20 with screws 26A.

In FIG. 4, an alternate bathroom application is shown comprising rubber gaskets 23 where the frame 20 meets the ceiling 50 and again where the top opening of the baffle 40 is attached to the tinted glass lens 21 with the lens screw and nut 24. This is to prevent moisture in a bathroom from getting into the lighting fixture. The application in FIG. 4, also comprises a lens support bracket 28 held to the lens 21 by the lens support bracket screw 25, spring hooks 22 attached to the frame 20 by screws 27, and the frame attached to the light baffle 40 and lens support bracket 28 by screws 26. In this application, the assembly 10 is attached to the frame 20 and removably retained in the recessed lighting can by the spring hooks 22.

Figure 5:
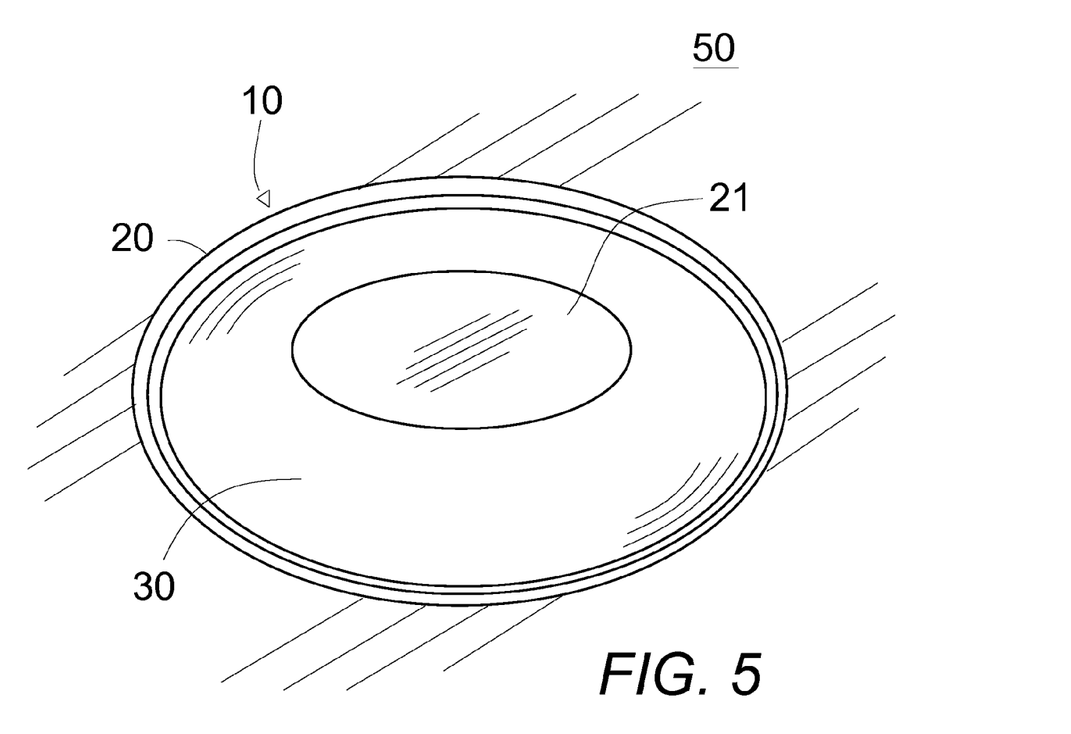
FIG. 5 is a perspective view of a ceiling with the tinted glass lens assembly of the present invention installed in the ceiling recessed light fixture.

In FIG. 5, the frame 20, the light baffle 40, and the reflective coating on the lens 21 are all color coordinated and colored to match a ceiling color.

Preferably color of all of the components of the lens assembly 10 matches that of the ceiling 50, which would often be a white ceiling, so that when the light is turned off, all that is visible is the white frame, white baffle and white glass surface. The existing light baffle 40 is attached to the new frame 20 and the new tinted lens 21 is attached to the existing baffle.

Figure 6:
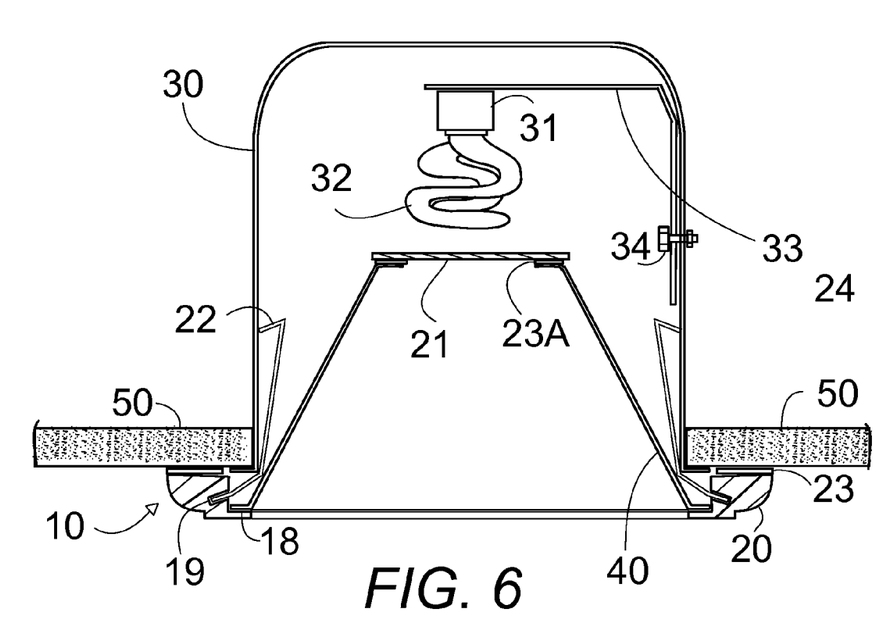
FIG. 6 is a partial cross-sectional view of the tinted glass lens assembly of the present invention shown installed in a ceiling recessed light fixture using a compact fluorescent bulb wherein gaskets are adhered between the lens and the existing light baffle and to the top of the frame.

In FIG. 6, a tinted glass lens assembly device 10 of the present invention provides a ring shaped lens gasket 23A having adhesive on top and bottom covered with a peel off strup is adhered between the lens 21 and the existing light baffle 40 and a larger ring shaped gasket 23 with adhesive on a bottom surface normally covered by a peel off strip is adhered to the top of the frame 20. A bottom of each of the spring clamps 22 is inserted into an annular groove 19 in the frame 20 so the spring clamps 22 support the frame and the entire lens assembly when friction fit into the existing recessed fixture can 30, shown installed in a ceiling recessed light fixture using a compact fluorescent bulb with the existing light baffle 40 resting on an inner ledge 18 of the frame 20. The stick on gaskets 23 and 23A and insertable spring clamps 22 make the assembly of the lens assembly quick and easy with no tools required.

Figure 7:
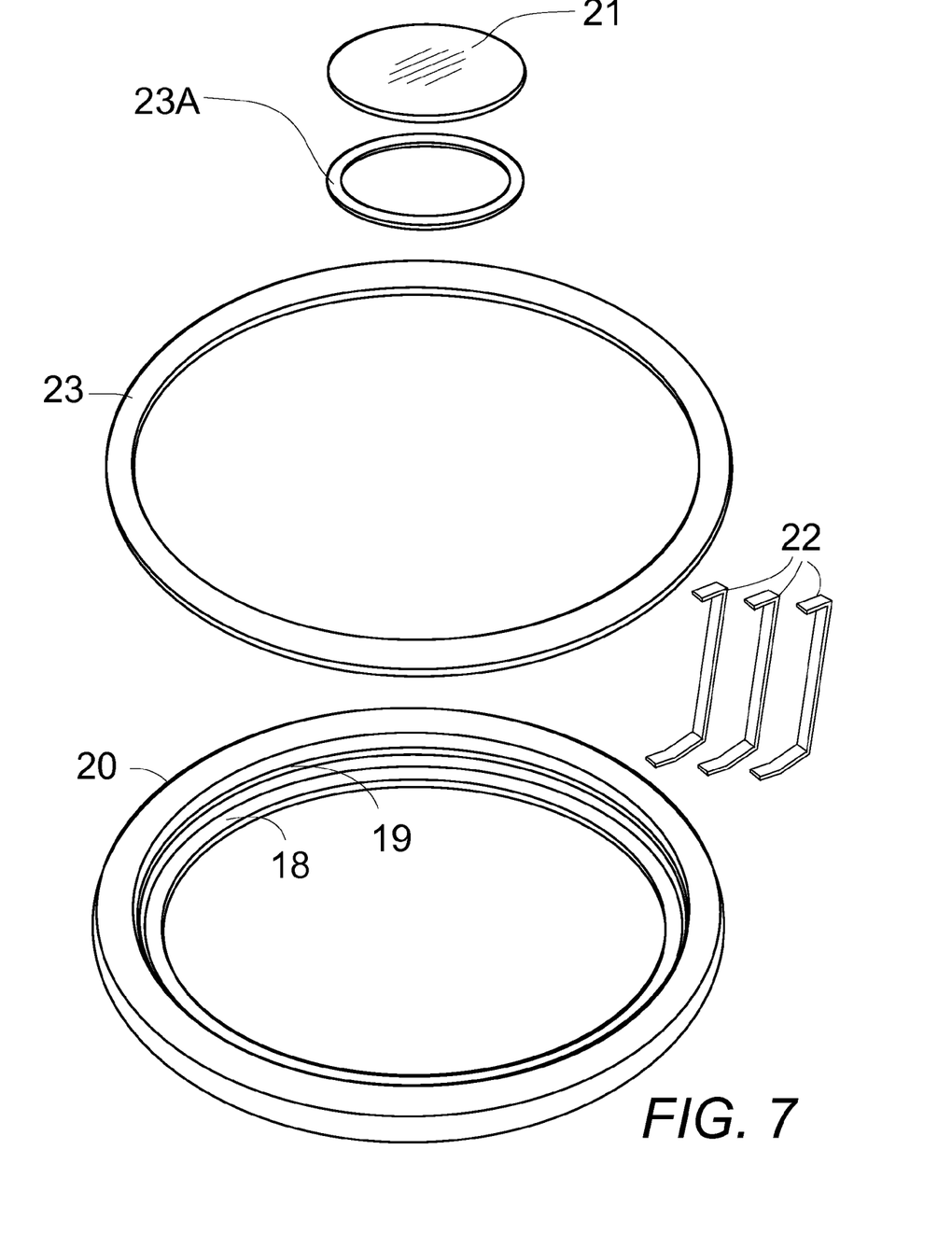
FIG. 7 is a perspective view showing the new components of FIG. 6 provided by the present invention to be used with an existing light baffle in an existing ceiling recessed fixture.

In FIG. 7, the new components of the lens assembly of FIG. 6 are shown aligned for assembly with an existing light baffle, not shown. The components including the frame 20, frame gasket 23, lens 21, lens gasket 23A, and spring brackets 22 are packaged together for a user to purchase and install in their existing ceiling recessed lighting fixture. In use, the existing light socket is adjusted by moving the socket bracket 33 as far as possible within the recessed lighting can 30 and tightened with the can bolt and nut 34 and then a compact fluorescent bulb 32 is screwed into the light socket 31. Tensioning spring hooks 22 are attached to the baffle or the frame for a friction fit within the recessed lighting can 30 so that the new lens unit instantly snaps into place in the existing can and removes instantly for bulb replacement or to install an alternate lens assembly with a differently tinted lens for other desired lighting effects.

The tinted glass lens 21 has an exterior reflective coating to match the light baffle 30 and frame 20 to cover the compact light bulb 32 and filter the light from the bulb. The tinted glass lens assembly 10 is preferably color coordinated to match the ceiling so that when the bulb is off, in the case of a white assembly, the only thing visible is the white of the new glass lens and the white of the existing light baffle, used in the new assembly, and the new white frame to match the white ceiling. The bulb is not visible. Then when the compact fluorescent light is turned on the new tinted glass lens 21 filters the normal white glare of the compact fluorescent bulb to produce a more pleasant light in the room of any desired color or intensity depending on the tinted glass lens chosen, which can be switched as desired, such as for different occasions or holidays. New tinted glass light assembly enhances lighting effect and hides bulb and eliminates normal white glare of compact fluorescent for more economical and ecological attractive lighting.

It is understood that the preceding description is given merely by way of illustration and not in limitation of the invention and that various modifications may be made thereto without departing from the spirit of the invention as claimed.

What is claimed is:

1. A tinted lens and frame assembly device installed in an existing recessed light unit having a compact fluorescent bulb, the device comprising:
a lens assembly comprising a frame structured to fit against a ceiling surface surrounding a recessed lighting opening in a ceiling, the recessed lighting opening housing an existing recessed lighting can having a light fixture socket recessed within the can to hold a compact fluorescent light bulb in the socket, the frame attached to a light baffle extending into the recessed lighting opening, the light baffle having a bottom opening mating with the frame and a top opening for admitting light therethrough; a tinted light transmitting lens attached at a top of the light baffle to cover the top opening, the lens being tinted to produce a desired light quality and a bottom surface of the lens coated with a camouflaging reflective coating to hide the compact fluorescent bulb from view when the bulb is not producing light; and a series of tension hooks extending outwardly peripherally around the lens assembly so that the series of tension hooks contact the can and removably retain the lens assembly in the can with the frame contacting the ceiling, the tension hooks attached to the light baffle and the light baffle attached to the frame.

2. The device of claim 1 wherein the frame, the light baffle, and the reflective coating on the lens are all color coordinated.

3. The device of claim 1 wherein the frame, the light baffle, and the reflective coating on the lens are all colored to match a ceiling color.

4. The device of claim 1 further comprising a lens gasket between the tinted lens and the light baffle.

5. The device of claim 4 wherein the lens gasket comprises an adhesive on each of two faces of the lens gasket so that the lens gasket is adhered to the tinted lens and the light baffle.

6. The device of claim 1 further comprising a frame gasket between the ceiling and the frame.

7. The device of claim 6 wherein the frame gasket comprises an adhesive on at least one of two faces of the frame gasket so that the gasket is adhered to the frame.

8. The device of claim 1 wherein the frame comprises an inner groove and the tension hooks are inserted in the inner groove.

9. The device of claim 8 wherein the frame further comprises an inner annular ledge and the light baffle rests on the ledge.

10. A tinted lens and frame assembly device installed in an existing recessed light unit having a compact fluorescent bulb, the device comprising:
a lens assembly comprising a frame structured to fit against a ceiling surface surrounding a recessed lighting opening in a ceiling, the recessed lighting opening housing an existing recessed lighting can having a light fixture socket recessed within the can to hold a compact fluorescent light bulb in the socket, the frame attached to a light baffle extending into the recessed lighting opening, the light baffle having a bottom opening mating with the frame and a top opening for admitting light therethrough; a tinted light transmitting lens attached at a top of the light baffle to cover the top opening, the lens being tinted to produce a desired light quality and a bottom surface of the lens coated with a camouflaging reflective coating to hide the compact fluorescent bulb from view when the bulb is not producing light; and a series of tension hooks extending outwardly peripherally around the lens assembly so that the series of tension hooks contact the can and removably retain the lens assembly in the can with the frame contacting the ceiling; wherein the frame, the light baffle, and the reflective coating on the lens all being color coordinated.

11. The device of claim 10 wherein the frame, the light baffle, and the reflective coating on the lens are all colored to match a ceiling color.

12. A tinted lens and frame assembly device installed in an existing recessed light unit having a compact fluorescent bulb, the device comprising:
a lens assembly comprising a frame structured to fit against a ceiling surface surrounding a recessed lighting opening in a ceiling, the recessed lighting opening housing an existing recessed lighting can having a light fixture socket recessed within the can to hold a compact fluorescent light bulb in the socket, the frame attached to a light baffle extending into the recessed lighting opening, the light baffle having a bottom opening mating with the frame and a top opening for admitting light therethrough; a tinted light transmitting lens attached at a top of the light baffle to cover the top opening, the lens being tinted to produce a desired light quality and a bottom surface of the lens coated with a camouflaging reflective coating to hide the compact fluorescent bulb from view when the bulb is not producing light; a series of tension hooks extending outwardly peripherally around the lens assembly so that the series of tension hooks contact the can and removably retain the lens assembly in the can with the frame contacting the ceiling; and a lens gasket between the tinted lens and the light baffle, the lens gasket comprising an adhesive on each of two faces of the lens gasket so that the lens gasket is adhered to the tinted lens and the light baffle.

* * * * *